US009713296B2

(12) United States Patent
Shimura et al.

(10) Patent No.: US 9,713,296 B2
(45) Date of Patent: Jul. 25, 2017

(54) RIDGE FORMATION METHOD AND DEVICE

(71) Applicant: Kazuo Shimura, Narita (JP)

(72) Inventors: Kazuo Shimura, Narita (JP); Takayuki Shimura, Narita (JP)

(73) Assignee: Kazuo Shimura, Narita (JP)

( * ) Notice: Subject to any disclaimer, the term of this patent is extended or adjusted under 35 U.S.C. 154(b) by 41 days.

(21) Appl. No.: 14/960,039

(22) Filed: Dec. 4, 2015

(65) Prior Publication Data
US 2016/0081257 A1   Mar. 24, 2016

Related U.S. Application Data

(63) Continuation of application No. PCT/JP2014/062231, filed on May 7, 2014.

(30) Foreign Application Priority Data

Jun. 7, 2013   (JP) .................................. 2013-120448

(51) Int. Cl.
*A01B 33/02*   (2006.01)
*A01B 33/12*   (2006.01)
(Continued)

(52) U.S. Cl.
CPC .............. *A01B 33/12* (2013.01); *A01B 13/02* (2013.01); *A01B 33/02* (2013.01); *A01B 33/16* (2013.01); *A01B 39/14* (2013.01)

(58) Field of Classification Search
CPC ......... A01B 33/02; A01B 33/12; A01B 13/02; A01B 33/082; A01B 33/028; A01B 33/08;
(Continued)

(56) References Cited

U.S. PATENT DOCUMENTS 3,878,799 A * 4/1975 Taylor .................... A01B 33/02
                                                      111/59
4,398,606 A * 8/1983 Herscher ................ A01B 33/12
                                                      172/112
(Continued)

FOREIGN PATENT DOCUMENTS

JP        05-067202 U    9/1993
JP        4300226 B2     7/2009
(Continued)

OTHER PUBLICATIONS

International Search Report, International Application No. PCT/JP2014/062231, Date of mailing of the international search report: Jul. 29, 2014, Total of 2 pages.

*Primary Examiner* — Robert Pezzuto
(74) *Attorney, Agent, or Firm* — Lynette Wylie; Apex Juris, PLLC

(57) ABSTRACT

A ridge formation method includes the steps of: providing a sieve instrument immediately after a tilling unit configured to scrape soil to throw the soil backward while rotate a rotor having a plurality of soil scraping pieces to cause the tilling unit to travel, the sieve instrument configured to receive the thrown soil to perform a sieve operation; and moving the sieve instrument in a reciprocating manner in a traveling direction to generate an impact on the received soil so that the soil is finely grained, and to separate the finely-grained soil from other impurities, whereby the finely-grained and separated soil is allowed to pass through a sieve mesh and fall onto a ground so that the falling soil is accumulated on the ground so as to form the ridge substantially the same in width as the sieve instrument on the ground.

8 Claims, 9 Drawing Sheets

(51) Int. Cl.
*A01B 13/02* (2006.01)
*A01B 33/16* (2006.01)
*A01B 39/14* (2006.01)

(58) Field of Classification Search
CPC ......... A01B 49/02; A01B 39/14; A01B 33/16; E01H 12/00
USPC ........ 171/63, 111, 124, 135; 172/1, 72, 112, 172/41, 42, 157, 695, 700, 701, 760, 770, 172/771
See application file for complete search history.

(56) References Cited

U.S. PATENT DOCUMENTS

| | | | | |
|---|---|---|---|---|
| 4,669,549 | A * | 6/1987 | Sanpei | A01B 33/02 172/112 |
| 6,119,791 | A * | 9/2000 | Mansur | A01B 13/02 172/695 |
| 6,199,639 | B1 * | 3/2001 | Gagnon | A01B 13/02 172/760 |
| 8,579,039 | B2 * | 11/2013 | Spindler | E01H 12/00 171/124 |
| 8,720,594 | B2 * | 5/2014 | Sato | E01H 12/00 171/135 |

FOREIGN PATENT DOCUMENTS

| | | |
|---|---|---|
| JP | 2012-075424 A | 4/2012 |
| JP | 2012-228211 A | 11/2012 |
| WO | WO2014/196302 A1 | 12/2014 |

\* cited by examiner (a)

(b)

RIDGE FORMATION METHOD AND DEVICE

CROSS REFERENCE TO RELATED APPLICATIONS

This is a continuation application of International Patent Application No. PCT/JP2014/062231 filed on May 7, 2014 claiming priority upon Japanese Patent Application No. 2013-120448 filed on Jun. 7, 2013, of which full contents are incorporated herein by reference.

BACKGROUND OF THE INVENTION

Field of the Invention

The present invention relates to a ridge formation method and a ridge formation device, and particularly to a method and a device for forming a ridge by removing impurities by sieve operation performed simultaneously with tilling operation and letting finely-grained soil passing through a sieve mesh and falling onto the ground accumulate on the ground. The present invention is preferable for performing field farming particularly in a field containing impurities.

Description of the Background Art

Conventionally, when the field farming is performed particularly in a field containing impurities, it was necessary to firstly remove impurities such as wood wastes, roots of plants, and stones that are scattered on the field. The transplantation of seedlings in tilled ridges containing impurities leads to problems in transplantation, and has a negative influence on the rooting and growth of the seedlings. It is considered that such tendency is significant particularly in a field of clayey soil. Therefore, conventionally, ridges were formed by operation of four steps in total by firstly removing impurities by sieving manually, secondly performing rough tilling operation using a rotary tiller, thirdly performing finely-grained soil tilling, and fourthly attaching a ridge formation tool immediately after the rotary tiller and exchanging a claw of the rotary tiller to one with a different shape.

As an example of the conventional ridge formation tool, Patent Document 1 discloses a furrower capable of easily shifting tilling operation and furrowing operation by arranging a furrowing body performing furrowing to be foldable. Moreover, the ridging working machine disclosed in Patent Document 2 is provided at the rear part of a tiller and performs ridging operation while advancing with the forward travelling of the tiller. A bottom plate and a leveling plate can be easily connected to an earth removing plate. The kind of a claw of the rotary tiller is disclosed in Patent Document 3.

PRIOR ART DOCUMENTS

Patent Documents

Patent Document 1: Japanese Patent Application Publication No. 2012-75424
Patent Document 2: Japanese Patent Application Publication No. 2012-228211
Patent Document 3: Japanese Utility Model Application Publication No. H05-67202

Problem to be Solved

In the conventional technology described above, the field farming particularly in a field containing impurities requires the trouble of as many as four steps including the operation of sieving to remove impurities. Thus, only the sieving to remove impurities requires one day, and a sequence of operation including the operation of forming ridges may not be finished in one day, making the formation of ridges and the transplantation operation difficult.

SUMMARY OF THE INVENTION

Thus, the inventor of the present application considered, based on the experience obtained through the engagement in cleaning operation at sandboxes for a long time and the practice of cleaning operation at sandboxes, whether a sandbox cleaning sieve machine can be used for operation of removing impurities in a field, and performed the operation of removing impurities in a field using the sandbox cleaning sieve machine according to the patent (Japanese Patent No. 4300226) owned by the inventor of the present application. As a result, impurities in the field were removed efficiently. Surprisingly, it was found that the impurities were removed and, in addition, finely-grained soil from which the impurities were removed accumulated, forming a ridge. Such a fact cannot be reached easily even by a professional. The present inventor has found that the operation requiring as many as four steps including the operation of removing impurities in the conventional technology can be performed by one-time operation including operation of removing impurities to operation of forming ridges, and has reached the present invention. The objective of the present invention is to solve the above-described problem and provide a method and a device for forming a ridge by removing impurities by sieve operation performed simultaneously with tilling operation and letting finely-grained soil passing through a sieve mesh and falling onto the ground accumulate on the ground.

Means for Solving Problems

In order to solve the above-described problems, there is provided a ridge formation method according to the present invention characterized by including the steps of: providing a sieve instrument immediately after a tilling unit configured to scrape soil to throw the soil backward while rotate a rotor having a plurality of soil scraping pieces to cause the tilling unit to travel, the sieve instrument configured to receive the thrown soil to perform a sieve operation; and moving the sieve instrument in a reciprocating manner in a traveling direction to generate an impact on the received soil so that the soil is finely grained, and to separate the finely-grained soil from other impurities, whereby the finely-grained and separated soil is allowed to pass through a sieve mesh and fall onto a ground so that the falling soil is accumulated on the ground so as to form the ridge substantially the same in width as the sieve instrument on the ground.

Further, in order to solve the above-described problems, there is preferably provided the ridge formation method according to the present invention characterized in that the step of moving the sieve instrument in a reciprocating manner further includes lifting the sieve instrument on a protrusion arranged at a position where a bottom portion of the sieve instrument and the protrusion contact each other and allowing the sieve instrument to fall, in a repetitive manner, during a reciprocating motion, so as to provide impact on the sieve instrument in a vertical direction, thereby improving a sieve function.

Still further, in order to solve the above-described problems, there is preferably provided the ridge formation method according to the present invention characterized in that the step of moving the sieve instrument in a reciprocating manner further includes allowing the sieve instrument to collide with an elastic body arranged at a collision position in a longitudinal direction of a reciprocating motion, so as to provide impact on the sieve instrument in a longitudinal direction as a collision-induced repulsive force, thereby improving a sieve function.

In order to solve the above-described problems, there is provided a ridge formation device according to the present invention characterized by including: a tilling unit including a rotor having a plurality of soil scraping pieces, the tilling unit configured to scrape soil to throw the soil backward while rotate the rotor to cause the tilling unit to travel; a sieve instrument arranged immediately after the tilling unit, the sieve instrument configured to receive the thrown soil to perform a sieve operation; and an impact unit configured to move the sieve instrument in a reciprocating manner in a traveling direction to generate an impact on the received soil so that the soil is finely grained, and to separate the finely-grained soil from other impurities, whereby the finely-grained and separated soil is allowed to pass through a sieve mesh and fall onto a ground so that the falling soil is accumulated on the ground so as to form the ridge substantially the same in width as the sieve instrument on the ground.

Further, in order to solve the above-described problems, there is preferably provided the ridge formation device according to the present invention characterized in that the impact unit is further configured to lift the sieve instrument on a protrusion arranged at a position where a bottom portion of the sieve instrument and the protrusion contact each other, and allow the sieve instrument to fall, in a repetitive manner, during a reciprocating motion, so as to provide impact on the sieve instrument in a vertical direction, thereby improving a sieve function.

Still further, in order to solve the above-described problems, there is preferably provided the ridge formation device according to the present invention characterized in that the impact unit is further configured to allow the sieve instrument to collide with an elastic body arranged at a collision position in a longitudinal direction of a reciprocating motion, so as to provide impact on the sieve instrument in a longitudinal direction as a collision-induced repulsive force, thereby improving a sieve function.

Advantageous Effects of Invention

With the ridge formation method and the ridge formation device according to the present invention, in the ridge formation method for forming a ridge having a substantially same width as a sieve instrument, using the sieve instrument that is provided immediately after a tilling unit for scraping soil and throwing the soil backward while travelling by rotating a rotor including a plurality of soil scraping pieces and that receives the soil thrown from the tilling unit to perform sieve operation, farm working conventionally requiring long time and large troubles can be performed easily by one-time operation. In addition, soil is grained more minutely by impact of reciprocating motion of the sieve instrument in a travelling direction, and such finely-grained soil passes through a sieve mesh to be scattered on the ground and accumulated in a layer form. This enables the formation of a soft ridge containing air among grains of the soil. At the same time, impurities such as wood wastes, roots of plants, and stones are removed by sieve operation, which exerts the effects of not only avoiding a conventional transplantation problem in transplantation of seedlings in ridges but also having a positive influence on the rooting and growth of seedlings.

The ridge formation device according to the present invention breaks soil more minutely by impact of reciprocating motion of the sieve instrument in a travelling direction. However, in addition to the reciprocating motion of the sieve instrument in a horizontal direction over an appropriate distance, the impact in a vertical direction is combined, whereby soil can be grained more minutely, improving the capability of separating impurities by sieve function. Furthermore, the elastic bodies are provided at positions collided by the sieve instrument in the front part and the rear part of the frame body because the collision-induced repulsive force of the sieve instrument against such elastic bodies improves sieve function of the sieve instrument.

In addition, with the configuration described above, a level adjustment unit can keep the sieve instrument horizontally or nearly horizontally with an appropriate angle when the operation is performed while the vehicle body travels and when the ridge formation device is used as a sieve machine in the state where the travelling of the vehicle body and the rotor are stopped. In this manner, the ridge formation device is also used simply as a sieve machine.

BRIEF DESCRIPTION OF THE DRAWINGS

For more thorough understanding of the present invention and advantages thereof, the following descriptions should be read in conjunction with the accompanying drawings in which.

DESCRIPTION OF EMBODIMENTS OF THE INVENTION

Figure 1:
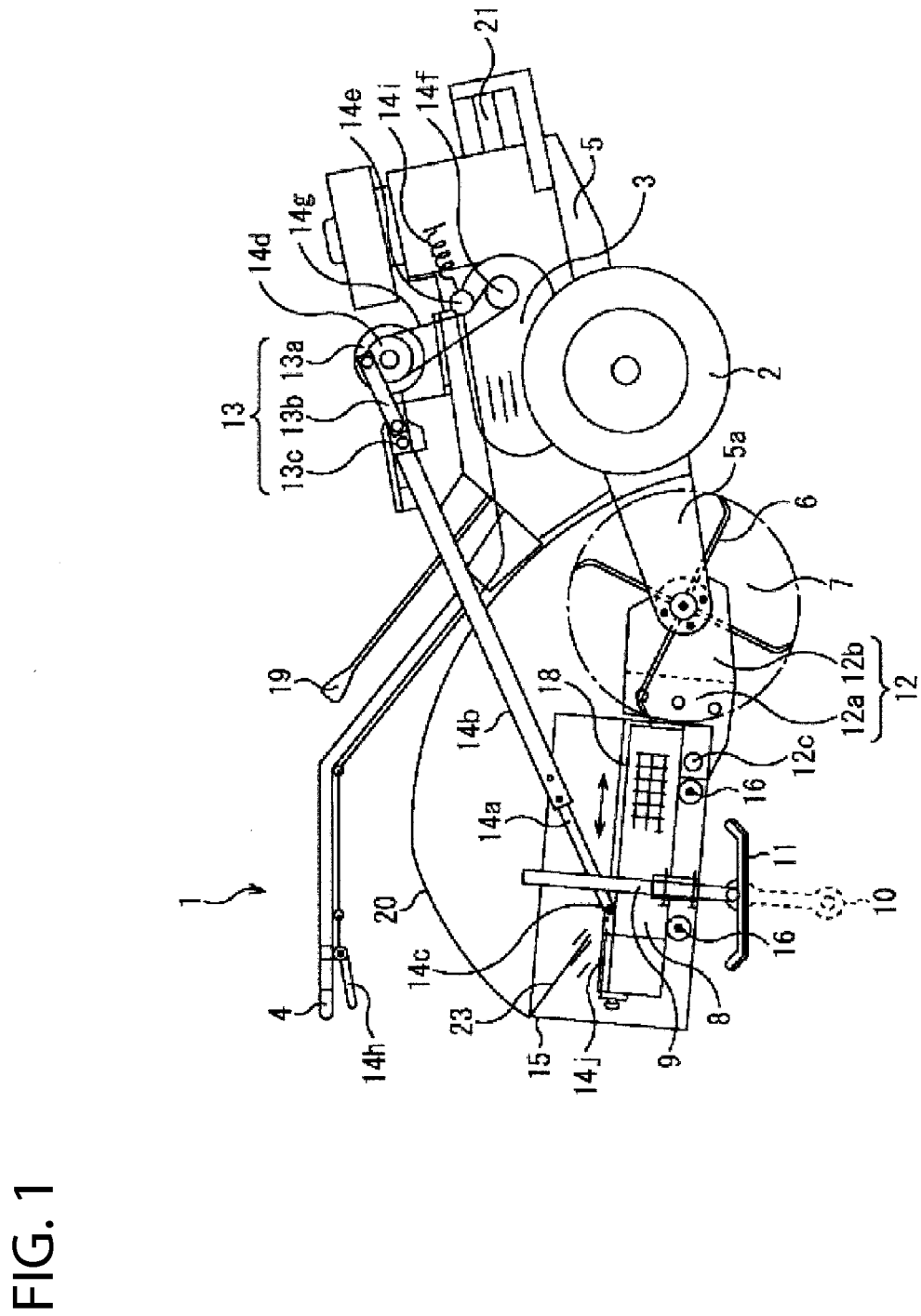
FIG. 1 depicts a schematic side view showing a ridge formation device as an embodiment of the present invention.
Figure 2:
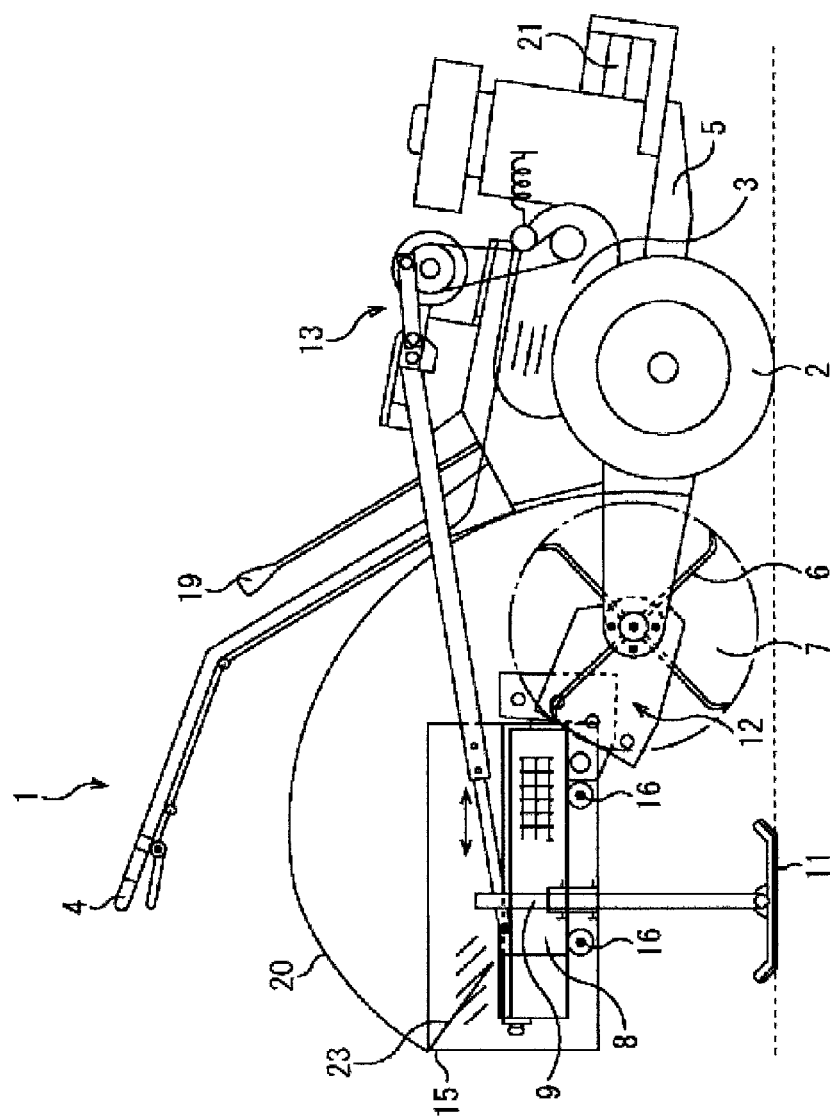
FIG. 2 depicts a schematic side view showing the ridge formation device as an embodiment of the present invention when used as a sieve machine, and an explanatory diagram (inside a circle) showing a connected crank portion.
Figure 3:
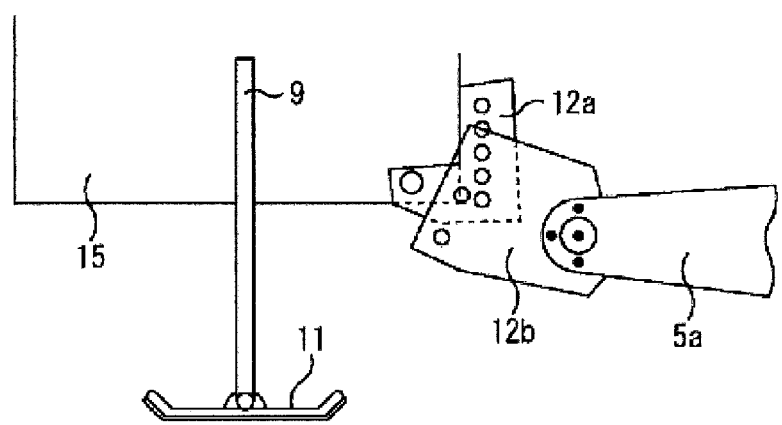
FIG. 3 depicts explanatory diagrams each showing a level adjustment unit of the ridge formation device as an embodiment of the present invention.
Figure 3:
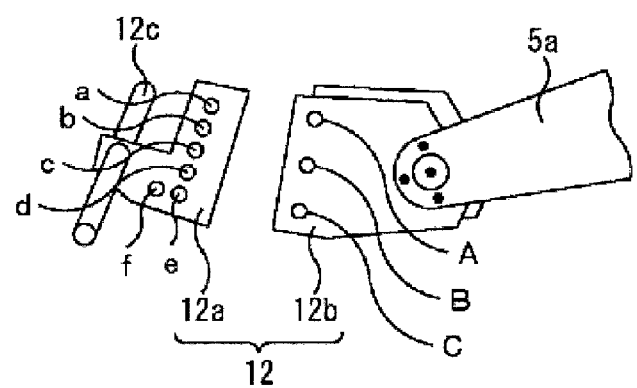
Figure 4:
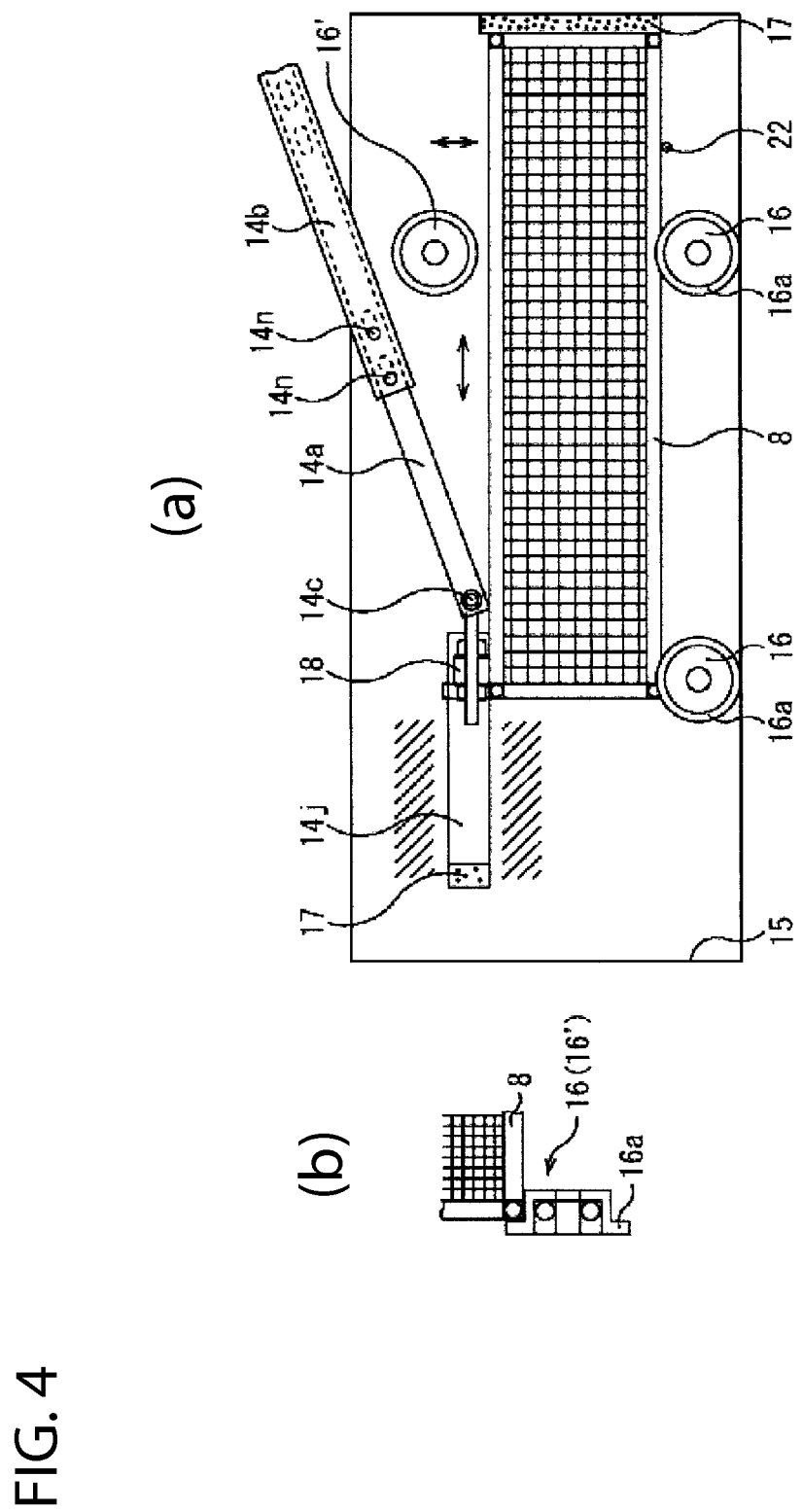
FIG. 4 depicts a side view (a) showing a state where a sieve instrument attachment frame is attached to a sieve instrument of the ridge formation device as an embodiment of the present invention, and an explanatory diagram (b) showing a flange portion of a wheel.
Figure 5:
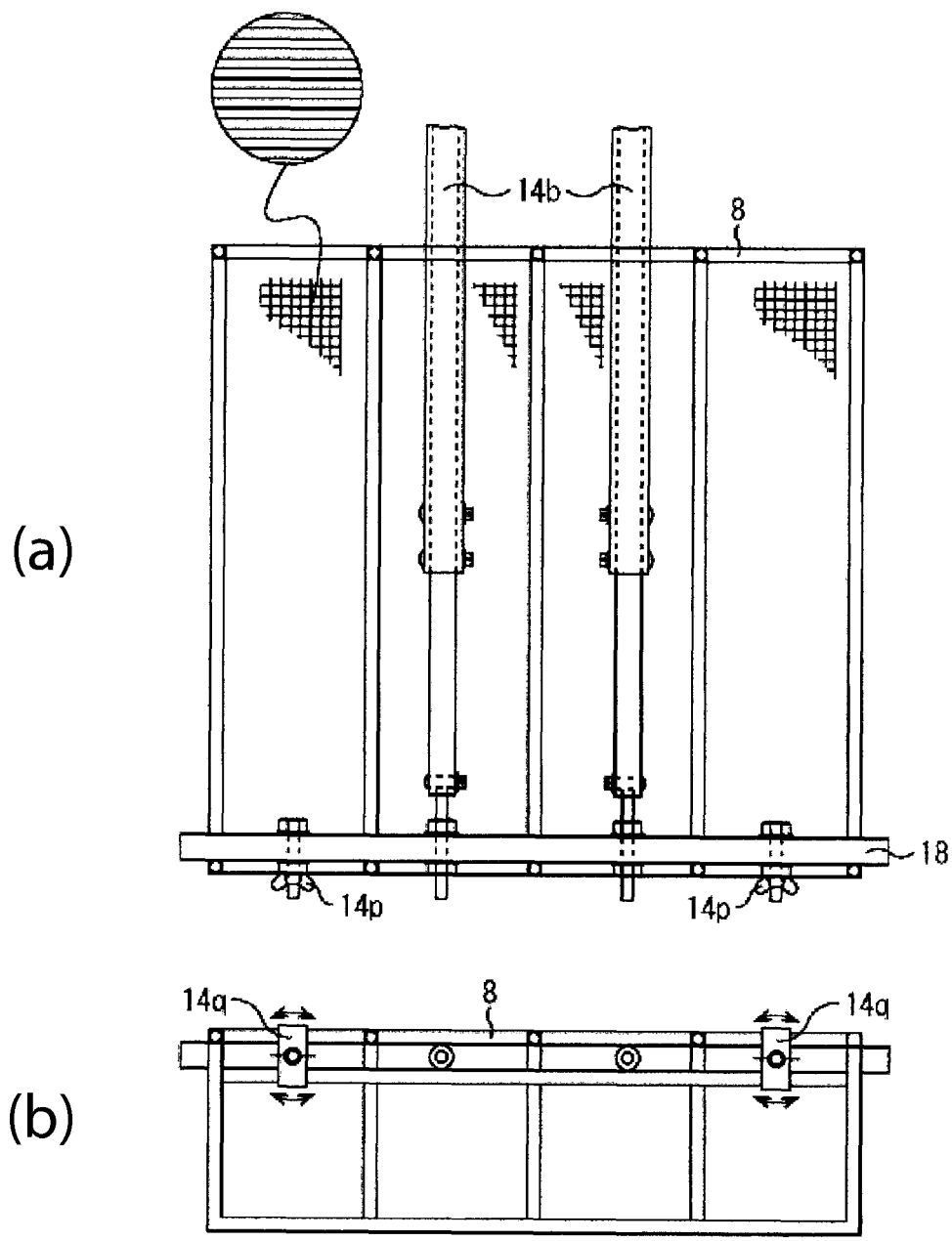
FIG. 5 depicts a plan view (a) and a side view (b) showing a state where the sieve instrument attachment frame is attached to the sieve instrument of the ridge formation device as an embodiment of the present invention, and an explanatory diagram (inside a circle) showing a comb-shaped net.
Figure 6:
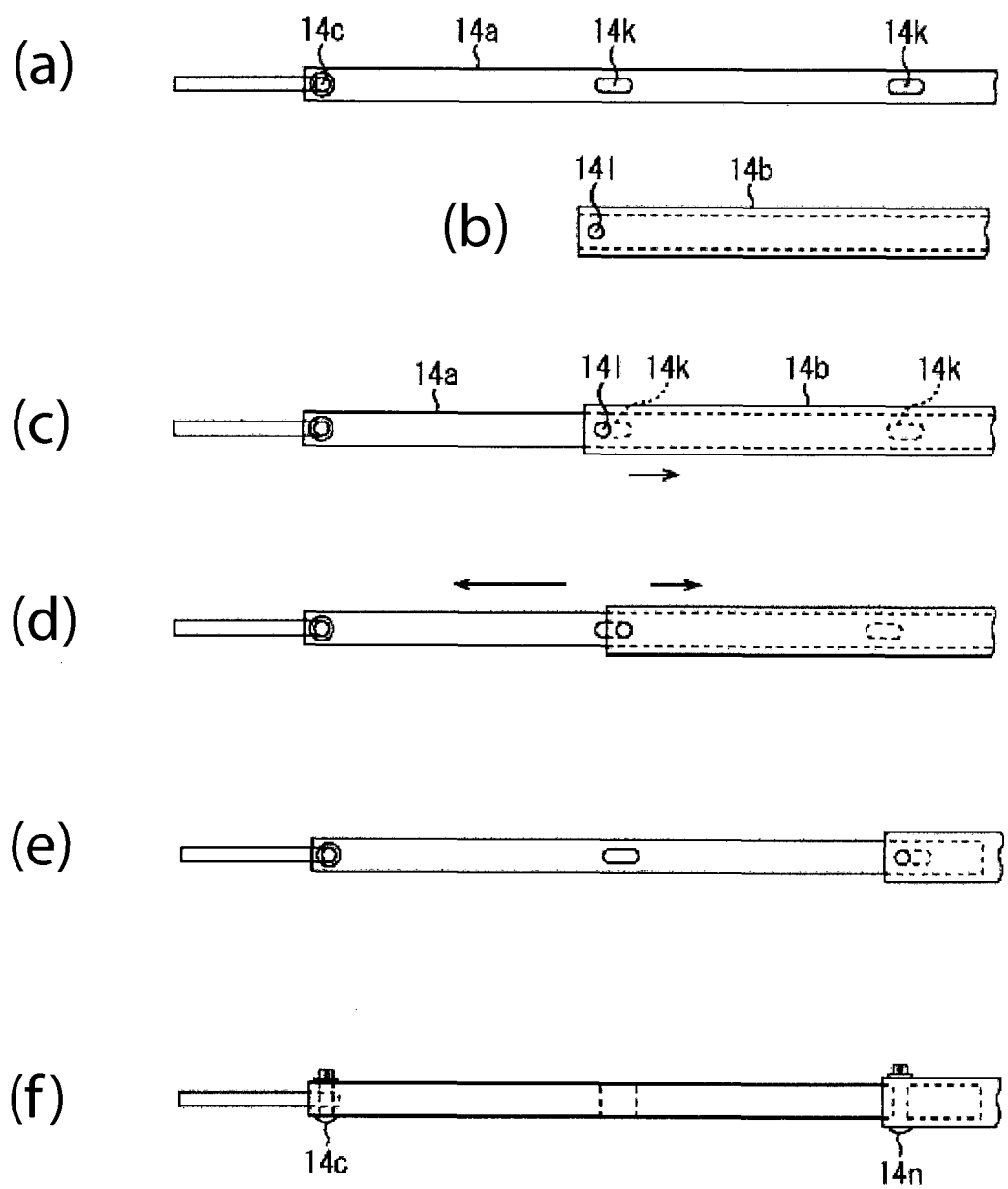
FIG. 6 depicts explanatory diagrams of a transmission shaft of the ridge formation device as an embodiment of the present invention.
Figure 7:
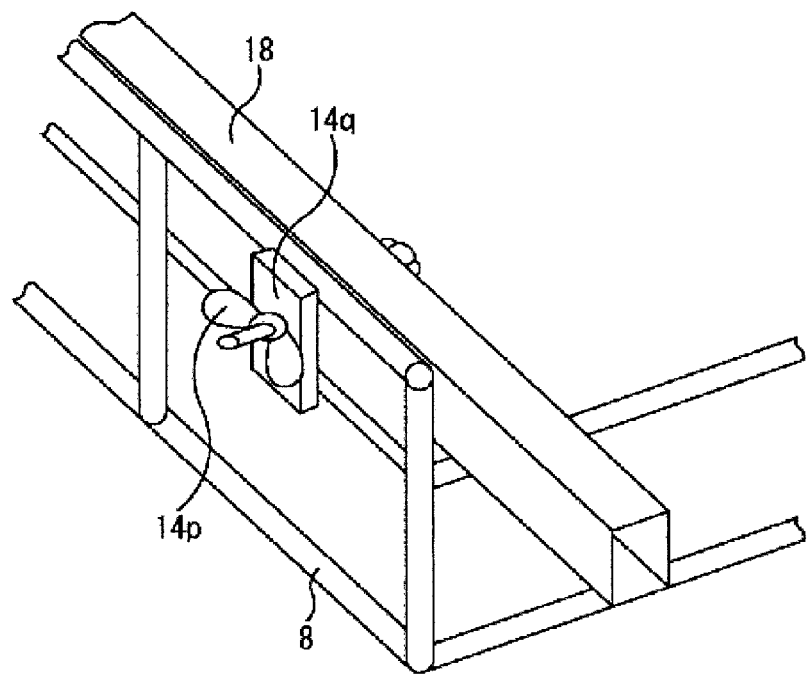
FIG. 7 depicts a partial perspective view showing a state where the sieve instrument attachment frame is attached to the sieve instrument of the ridge formation device as an embodiment of the present invention.

A preferred embodiment for implementing the invention (hereinafter, referred to as an "embodiment") will be described based on the enclosed drawings. However, the ridge formation device of the present invention is not limited by such an embodiment. An embodiment describes one type of ridge formation device including a rotor with soil scraping pieces and a sieve instrument in a waking type rotary tiller. However, a ridge formation device employing a tractor instead of the waking type rotary tiller is also included in the present invention. FIG. 1 is a schematic side view showing the ridge formation device as an embodiment of the present invention. FIG. 2 is a schematic side view showing the ridge formation device as an embodiment of the present invention when used as a sieve machine. FIG. 3 is explanatory diagrams each showing a level adjustment unit of the ridge formation device as an embodiment of the present invention. FIG. 4 is a side view showing the state where a sieve instrument attachment frame is attached to a sieve instrument of the ridge formation device as an embodiment of the present invention. FIG. 5 is a plan view and a side view showing the state same as the state in FIG. 4. FIG. 7 is a partial perspective view showing the state same as the state in FIG. 4. FIG. 6 is explanatory diagrams of a transmission shaft of the ridge formation device as an embodiment of the present invention.

As shown in FIG. 1, a ridge formation device 1 as an embodiment of the present invention includes a pair of laterally travelling wheels 2, a vehicle body 5 provided with a motor 3 for rotating the travelling wheels, and a handle 4, a tilling unit including a rotor 7 with a plurality of soil scraping pieces 6 provided in a circumferential direction to scrape soil containing impurities and the like on the rear side of the travelling wheels 2, a net-form sieve instrument 8 reciprocating in a nearly horizontal direction on the rear side of the rotor, foot plates 11 attached to be exchangeable with auxiliary wheels 10 on ends of supporting leg parts 9 provided to be adjustable in height on both of the lateral sides of the sieve instrument, a level adjustment unit 12 for keeping the sieve instrument horizontally or nearly horizontally with an appropriate angle during operation of the sieve instrument, and a transmission mechanism 14 for reducing a speed of rotational motion of the motor, converting the rotational motion into reciprocating motion, and transmitting it to the sieve instrument by a crank mechanism 13.

In the ridge formation device 1, the sieve instrument 8 is provided inside a frame body 15 connected to the vehicle body 5, and placed to be removable and movable in a longitudinal direction on a pair of wheels 16, 16 provided at two positions on the longitudinal sides of a bottom portion of the frame body. The frame body is supported by the supporting leg parts 9 that are provided to be adjustable in length on both of the lateral sides of the frame body and include, on the end, the foot plates 11 attached to be exchangeable with the auxiliary wheels 10. The front part of the frame body is connected to the vehicle body 5 through the level adjustment unit 12, and the level adjustment unit keeps the sieve instrument horizontally or nearly horizontally with an appropriate angle during operation of the ridge formation device and the sieve machine.

As shown in FIG. 4, the frame body 15 is formed by a rectangular frame body, and the sieve instrument 8 is stored in the frame body 15 with space for reciprocating in the longitudinal direction therein. At two positions on the longitudinal sides of an inner bottom portion of the frame body 15, rotation axes with a pair of wheels 16, 16 on both the ends are attached to be rotatable. As shown in (b) of FIG. 4, flanges 16a are formed on the side surface side of the frame body 15 of the wheels 16, 16. The sieve instrument 8 is placed inside the flanges 16a of the pair of longitudinal wheels not to be in contact with the side surface of the frame body. As shown in FIG. 1, lateral side surface plates of the frame body 15 include a slide groove 14j in the front-back direction, and both ends of the sieve instrument attachment frame 18 are attached to be slidable on the slide groove 14j.

Figure 8:
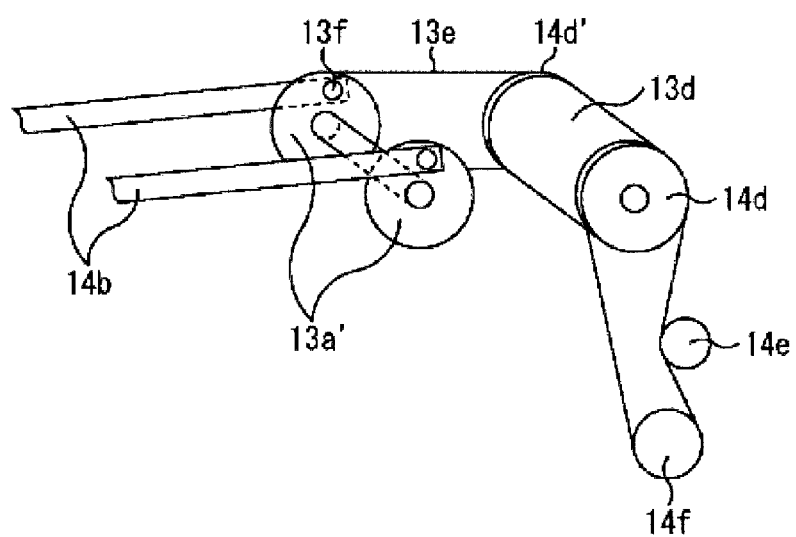
FIG. 8 depicts an explanatory diagram showing another crank mechanism of the ridge formation device as an embodiment of the present invention.
Figure 9:
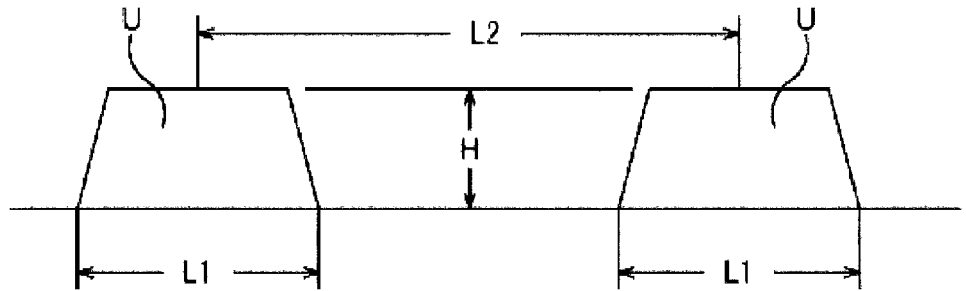
FIG. 9 depicts an explanatory diagram of ridges formed by an example of the present invention.

Meanwhile, as shown in FIG. 1, the rotational motion of the motor 3 is transmitted from a drive pulley 14f to an interlocking pulley 14d through a belt 14g, reduced in speed by a reduction gear (gear train), converted into reciprocating motion by the crank mechanism 13 (13a, 13b, 13c), and transmitted to the sieve instrument 8 by a transmission mechanism such as the transmission shaft 14. Moreover, as another example of the crank mechanism, two crank pulleys 13a', 13a' may be provided so that the center axes thereof are connected to each other, one of such crank pulleys 13a' may be connected, via a v belt 13e, to a pulley 14d' interlocking with the interlocking pulley 14d through a reduction gear (gear train) 13d, and each of the crank pulleys 13a', 13a' may be connected to the sieve instrument 8 through outer transmission shafts 14b, 14b and inner transmission shafts 14a, 14a (see FIG. 8). Then, as shown in FIG. 5 and FIG. 7, the sieve instrument 8 is attached to be removable on the sieve instrument attachment frame 18 by fastening rotary engaging tools 14q at the vertically long position with thumb-screws 14p. As shown in FIG. 4, the transmission shaft 14 is connected to be rotatable to the sieve instrument attachment frame 18 by a universal pin 14c. With the reciprocating motion of the transmission shaft 14 by the crank mechanism 13, both the ends of the sieve instrument attachment frame 18 slide along the slide groove 14j, so that the sieve instrument 8 reciprocates in the longitudinal direction on the wheels 16, 16.

Moreover, a tension pulley 14e is provided between the interlocking pulley 14d and the drive pulley 14f, and the tension pulley 14e is connected to an interrupting lever 14h and a spring 14i. When the interrupting lever 14h is pulled or restored, a path for transmitting the rotational motion of the motor to the crank mechanism is interrupted to activate or stop the reciprocating motion of the sieve instrument. Then, the rotational motion of the motor is transmitted to the reduction gear from the drive pulley 14f through another belt, reduced in speed, and subsequently rotates the rotor 7 by a sprocket and a chain. Moreover, the sieve instrument 8 can be operated while the travelling wheels 2 are stopped by selecting neutral using a shift lever 19. In this case, the rotor 7 is set to be stopped simultaneously.

Next, the level adjustment unit of the present invention is a connection tool for connecting the sieve instrument or the frame body to the vehicle body at an appropriate angle so that the sieve instrument or the frame body is kept horizontally or nearly horizontally during operation. The level adjustment unit of the ridge formation device as an embodiment will be described. However, the invention is not limited to such an embodiment. As shown in FIG. 3, the level adjustment unit 12 includes an L-shaped piece 12a fixed on a crossbar 12c extended in a lateral direction near a front lower part of the frame body 15, and a holding part 12b fixed on a vehicle body convex portion 5a. A plurality of through-holes is perforated on the L-shaped piece 12a and the holding part 12b with appropriate intervals. Then, the L-shaped piece 12a is inserted in space of the holding part 12b and fixed with bolts and nuts while appropriately changing positions of the through-holes of the L-shaped piece 12a and the holding part 12b. In this manner, an attachment angle of the frame body 15 and the vehicle body is determined automatically, allowing the sieve instrument 8 during operation to be kept at a nearly horizontal angle.

For example, when the through-holes a and A, c and B, and e and C are overlapped and fixed, the frame body 15 and the sieve instrument 8 are fixed in the state slightly inclined forward, as shown in FIG. 1. However, when the ridge formation device 1 travels, the rotor 7 sinks more deeply than a center axis of the rotor while scraping soil. Thus, in such a state, the sieve instrument 8 is kept nearly horizontally. Next, when the ridge formation device stops travelling and performs operation as a sieve machine, the through-holes c and A, and f and B are overlapped and fixed in the state where the supporting leg parts 9 are extended highly so that the rotor 7 floats above the ground. A length of the transmission shaft is also adjusted. In this manner, the front parts of the frame body 15 and the sieve instrument 8 are lifted relative to the vehicle body and fixed, allowing the frame body 15 and the sieve instrument 8 to be kept nearly horizontally and enabling operation as a sieve machine (see FIG. 2). In the level adjustment unit described above, the vehicle body convex portion 5a may be connected directly to the L-shaped piece 12a without the holding part 12b. A through-groove may be provided instead of the through-holes of the L-shaped piece 12a, and a through-hole of the vehicle body convex portion 5a may be overlapped on the through-groove and fixed with a bolt and a nut, so that the inclination can be adjusted continuously (not shown).

Next, as shown in FIG. 1, the tilling unit is provided on the rear side of the travelling wheels 2, and the rotor 7 includes, at both ends of the axis, screw-type face shifting blades (not shown) for gathering soil and the like to a middle portion. At two or more positions in the middle of both the face shifting blades, four to eight soil scraping pieces 6 for scraping soil and the like are provided in a circumferential direction with equal intervals. The soil scraping piece 6 is plate-shaped with the root side wider than the end side and is curved in a rotational direction. Soil and the like scraped by the rotation of the soil scraping pieces 6 are received by the sieve instrument 8 provided on the rear side. There are provided a cover sheet 20 for covering an upper side part of the rotor and the frame body, and a guide plate 23 diagonal toward the sieve instrument 8 from the rear end portion of the cover sheet 20. A part of soil and the like scraped by the soil scraping pieces 6 collides the cover sheet 20 to be guided to the sieve instrument 8 by the guide plate 23. Moreover, the cover sheet 20 is provided to be openable from the rear end portion to the upper side part of the sieve instrument 8. When the ridge formation device is used as a sieve machine, the sheet is lifted upward to be open, so that soil and the like can be thrown into the sieve instrument 8 using a shovel and the like. Regarding the sieve instrument 8, a sieve instrument having a different width can be disposed to be exchangeable in accordance with a shoulder length of a ridge to be formed. Furthermore, it is possible to average a surface of ridges to be formed by adjusting an interval of the soil scraping pieces 6 provided at two positions in accordance with a width of the sieve instrument 8. Moreover, a sieve mesh is not limited particularly, and can be appropriately selected from a range of 5 to 20 mm, for example, in accordance with the kind of soil or crops, and the like.

Furthermore, one of the characteristics of the ridge formation device according to the present invention is the addition of impact onto the sieve instrument 8 in a vertical direction as well as the reciprocating motion of the sieve instrument 8 in the longitudinal direction. A method of adding impact onto the sieve instrument 8 in the vertical direction is not particularly limited. For example, as shown in FIG. 4, a protrusion 22 is provided at a position brought into contact with the wheel 16 in an outer bottom portion of the sieve instrument 8, or the protrusion 22 is provided at a position brought into contact with the outer bottom portion of the sieve instrument in an outer periphery of the wheel 16 (not shown). Then, the action of lifting the sieve instrument 8 itself by bringing it into contact with the protrusion and then letting the sieve instrument 8 fall due to repulsive force when colliding the wheels 16' on the upper part, is repeated, thus adding impact in the vertical direction onto the sieve instrument 8. An embodiment without the wheel 16' is also included in the present invention. Moreover, as the sieve instrument, a latticed net is used normally, as shown in FIG. 5. However, in the case of a field with much grass and roots or cilia of plants, they need to be removed various times because they are entangled with the net to shield a mesh, causing a trouble in operation. Then, as shown in the circle of (a) of FIG. 5, at least the net extended on the bottom portion is preferably comb-shaped instead of a latticed one. Normally, a comb-shaped net is attached so that filaments forming the net direct at a right angle direction relative to a direction of reciprocating motion of the sieve instrument, whereby filament bodies such as roots or cilia of grass can be separated efficiently, and roots or cilia of grass remaining on the net can be removed easily using a brush conveniently.

The present invention also includes an embodiment in which in addition to the impact in the vertical direction added to the sieve instrument 8, or separately from the impact in the vertical direction, an elastic body 17 is provided at a position collided by the sieve instrument on both of or one of the front part and the rear part of the frame body so that the repulsive force of collision of the sieve instrument against the elastic body 17 improves sieve function of the sieve instrument 8 (see FIG. 4). Moreover, on the slide groove 14j on which an element attached to the sieve instrument to reciprocate together with the sieve instrument, e.g., the sieve element attachment frame 18, as shown in FIG. 4, reciprocates, the elastic body 17 may be provided at a rear end portion of the slide groove 14j collided by the sieve instrument attachment frame 18. Here, the elastic body 17 widely includes a spring and the like, in addition to an elastic body of natural rubber, synthetic rubber, and the like. It is preferable that the transmission shaft shown in FIG. 6 is adopted in addition to the collision of the sieve instrument against the elastic body 17. As shown in FIG. 6, two transmission shafts (inner transmission shaft 14a and outer transmission shaft 14b) are provided to be slidable in a nested structure. A plurality of long holes 14k such as the first long hole and the second long hole is formed on the inner transmission shaft 14a, and one or more round holes 14l are formed on the outer transmission shaft 14b. Both the shafts 14a, 14b are connected to each other by penetratedly fixing a connection pin 14n while changing the position of the long hole 14k overlapped on the round hole 14l, whereby a length of the transmission shaft 14 can be adjusted (see (c) to (e) of FIG. 6). In this manner, when the level of the sieve instrument is adjusted in accordance with the specifications of the sieve machine and the specifications of the ridge formation device, the length of the transmission shaft 14 can be adjusted.

Furthermore, the position where the sieve instrument 8 collides the elastic body 17 is set to the slightly near side than the original returning position (position at which the crank shaft becomes horizontal). When the sieve instrument 8 is drawn in an arrow direction in the state of (c) of FIG. 6 before colliding the elastic body 17, the sieve instrument 8 strongly collides the elastic body 17 and, at the same time, the reaction makes the sieve instrument 8 return instantaneously and advance reversely, and the inner transmission shaft 14*a* and the outer transmission shaft 14*b* advance in opposite directions (extending direction), i.e., the state of (d) of FIG. 6. Thus, the sieve instrument 8 can change the direction instantaneously without waiting until reaching the turning point of the crank. Moreover, the inner transmission shaft 14*a* and the outer transmission shaft 14*b* slide in a range of a distance of a long hole, whereby a load on the connection pin and the crank pin is reduced, thus allowing smooth direction change with the reciprocating motion of the sieve instrument. Such instantaneous direction change increases impact force of collision of the sieve instrument against the elastic body 17, further increasing the sieving effect. In addition, the sound-proofing effect is also increased by providing the elastic body. Moreover, two round holes 14*l* may be provided on the outer transmission shaft 14*b*, and two first long holes and two second long holes may be provided on the inner transmission shaft 14*a* corresponding to the outer transmission shaft 14*b*, so that both the shafts 14*a*, 14*b* are connected to each other with two connection pins 14*n*, 14*n* (see FIG. 4).

Moreover, the ridge formation device as an embodiment may be configured such that the sieve instrument itself reciprocates without providing a frame body, or may be configured using well-known transmission mechanisms such as the combination of a belt and a pulley or a string and a roller, instead of the transmission shaft 14. A ridge formation device having such a configuration is also included in the present invention. The materials forming the ridge formation device according to the present embodiment are not limited particularly. However, the materials of the frame body 15, the sieve instrument 8, the supporting leg part 9, the foot plate 11 and the level adjustment unit 12 are preferably light-weighed materials, e.g., metal such as aluminum, duralumin, and titanium, plastic excellent in strength such as polycarbonate, FRP, and ABS resin, and the like, if possible. The use of light-weighted materials improves the operation and the work efficiency.

Moreover, the ridge formation device of the present invention may include, on the rear side, a transplantation machine for transplanting cabbages, lettuces, root vegetables, and the like or a sowing machine for stripe-sowing or broadcast-sowing seeds on formed ridges. Alternatively, the ridge formation device of the present invention may include, in both of or one of the front side and the rear side of the rotary tiller or the tractor, a fertilizer distributor and the like for spraying a fertilizer in accordance with a crop. Furthermore, the ridge formation device of the present invention is significantly useful not only for a field but also when a farm field is used for field farming after rice cropping and rice harvest or when a field is reproduced by removing impurities from a farm field containing impurities such as wood wastes, roots of plants, and stones due to an earthquake, for example.

EXAMPLES

The ridge formation device described in an embodiment was formed, and in a non-disclosed manner, a sequence of operation including the removal of impurities to the formation of ridges was performed in a field containing impurities such as wood wastes, roots of plants, and stones. In the present example, a mesh of 10×10 mm with a width of 400 mm was used for the sieve instrument, a distance of reciprocating motion in the longitudinal direction of the sieve instrument was set to 100 mm, the number of reciprocating motions was set to 2 to 6.5 times per second, and two rows of four soil scraping pieces with a length of 190 to 200 mm, that is, eight soil scraping pieces in total were provided in the rotor. First, the ridge formation device was transported to the field, and the supporting leg parts were fixed after extending their length so that the lower end portion of the soil scraping piece of the rotor floated above the ground. In addition, the level adjustment unit was fixed at a position of sieve operation, and the sieve operation was performed. Next, the foot plates were attached on the ends of the supporting leg parts, and the length of the supporting leg part was set such that the foot plate was positioned in the middle between the lower end portion of the soil scraping piece of the rotor and the axis. Furthermore, the through-holes of the level adjustment unit were overlapped appropriately and fixed with bolts and nuts. In such a state, a sequence of operation including the removal of impurities to the formation ridges in the field was performed. Then, after the ridge formation device was taken from the field to finish the operation, the foot plates were removed from the supporting leg parts and auxiliary wheels were attached instead to move the ridge formation device to a given storage area.

As a result of the above-described sequence of operation of forming ridges, there were formed ridges U having a shoulder width L1 of 390 to 400 mm, which is nearly equal to the width of the sieve instrument of 400 mm, a height H of 150 to 200 mm, and a width L2 of 1000 mm. Moreover, it was confirmed, when soil forming the ridges was taken in a hand, that the soil is soft with air contained among grains thereof. Moreover, the clogging of the sieve instrument was reduced, thus improving the work efficiency. Furthermore, when the operation was performed in a field with grass using the sieve instrument with a comb-shaped net, the trouble of removing roots or cilia of grass entangled with the net by brushing was reduced significantly, thus improving the work efficiency remarkably. With the use of the ridge formation device according to the present invention, the sieve operation, which was performed manually by at least two workers conventionally, has been achieved by one worker. In addition, the operation time has been reduced, making the operation easier. Moreover, when the ridge formation device is moved, the auxiliary wheels are grounded and rotated. Thus, it was confirmed that the ridge formation device can be moved without any problem even when travelling on an undulating ground or floor surface.

INDUSTRIAL APPLICABILITY

The ridge formation device according to the present invention relates to a method and a device for forming a ridge by removing impurities by sieve operation performed simultaneously with tilling operation and letting finely-grained soil passing through a sieve mesh and falling onto the ground accumulate on the ground, and is significantly useful when used for field farming particularly in a field containing impurities, from the viewpoints of improvement of work efficiency and economy.

| (Reference Numerals) | | | |
|---|---|---|---|
| 1 | Ridge formation device | 2 | Travelling wheel |
| 3 | Motor | 4 | Handle |
| 5 | Vehicle body | 5a | Vehicle body convex portion |
| 6 | Soil scraping piece | 7 | Rotor |
| 8 | Sieve instrument | 9 | Supporting leg part |
| 10 | Auxiliary wheel | 11 | Foot plate |
| 12 | Level adjustment unit | 12a | L-shaped piece |
| 12b | Holding part | 12c | Crossbar |

-continued

| (Reference Numerals) | | | |
|---|---|---|---|
| 13 | Crank mechanism | 13a | Crank |
| 13a' | Crank pulley | 13b | Crank shaft |
| 13c | Slider | 13d | Reduction gear |
| 13e | V belt | 13f | Crank pin |
| 14 | Transmission shaft | 14a | Inner transmission shaft |
| 14b | Outer transmission shaft | 14c | Universal pin |
| 14d | Interlocking pulley | 14d' | Pulley |
| 14e | Tension pulley | 14f | Drive pulley |
| 14g | Belt | 14h | Interrupting lever |
| 14i | Spring | 14j | Slide groove |
| 14k | Long hole | 14l | Round hole |
| 14n | Connection pin | 14p | Thumbscrew |
| 14q | Engaging tool | 15 | Frame body |
| 16, 16' | Wheel | 16a | Flange |
| 17 | Elastic body | 18 | Sieve instrument attachment frame |
| 19 | Shift lever | | |
| 21 | Weight balancer | 20 | Cover sheet |
| 23 | Guide plate | 22 | Protrusion |
| | | U | Ridge |

What is claimed is:

1. A ridge formation method comprising the steps of:
providing a sieve instrument immediately after a tilling unit configured to scrape soil to throw the soil backward while rotate a rotor having a plurality of soil scraping pieces to cause the tilling unit to travel, the sieve instrument configured to receive the thrown soil to perform a sieve operation; and
moving the sieve instrument in a reciprocating manner in a traveling direction to generate an impact on the received soil so that the soil is finely grained, and to separate the finely-grained soil from other impurities, whereby
the finely-grained and separated soil is allowed to pass through a sieve mesh and fall onto a ground so that the falling soil is accumulated on the ground so as to form the ridge substantially the same in width as the sieve instrument on the ground.

2. The ridge formation method according to claim 1 wherein
the step of moving the sieve instrument in a reciprocating manner further includes
lifting the sieve instrument on a protrusion arranged at a position where a bottom portion of the sieve instrument and the protrusion contact each other and allowing the sieve instrument to fall, in a repetitive manner, during a reciprocating motion, so as to provide impact on the sieve instrument in a vertical direction, thereby improving a sieve function.

3. The ridge formation method according to claim 1 wherein
the step of moving the sieve instrument in a reciprocating manner further includes
allowing the sieve instrument to collide with an elastic body arranged at a collision position in a longitudinal direction of a reciprocating motion, so as to provide impact on the sieve instrument in a longitudinal direction as a collision-induced repulsive force, thereby improving a sieve function.

4. The ridge formation method according to claim 2 wherein
the step of moving the sieve instrument in a reciprocating manner further includes
allowing the sieve instrument to collide with an elastic body arranged at a collision position in a longitudinal direction of a reciprocating motion, so as to provide impact on the sieve instrument in a longitudinal direction as a collision-induced repulsive force, thereby improving a sieve function.

5. A ridge formation device comprising:
a tilling unit including a rotor having a plurality of soil scraping pieces, the tilling unit configured to scrape soil to throw the soil backward while rotate the rotor to cause the tilling unit to travel;
a sieve instrument arranged immediately after the tilling unit, the sieve instrument configured to receive the thrown soil to perform a sieve operation; and
an impact unit configured to move the sieve instrument in a reciprocating manner in a traveling direction to generate an impact on the received soil so that the soil is finely grained, and to separate the finely-grained soil from other impurities, whereby
the finely-grained and separated soil is allowed to pass through a sieve mesh and fall onto a ground so that the falling soil is accumulated on the ground so as to form the ridge substantially the same in width as the sieve instrument on the ground.

6. The ridge formation device according to claim 5 wherein
the impact unit is further configured to lift the sieve instrument on a protrusion arranged at a position where a bottom portion of the sieve instrument and the protrusion contact each other, and allow the sieve instrument to fall, in a repetitive manner, during a reciprocating motion, so as to provide impact on the sieve instrument in a vertical direction, thereby improving a sieve function.

7. The ridge formation method according to claim 5 wherein
the impact unit is further configured to allow the sieve instrument to collide with an elastic body arranged at a collision position in a longitudinal direction of a reciprocating motion, so as to provide impact on the sieve instrument in a longitudinal direction as a collision-induced repulsive force, thereby improving a sieve function.

8. The ridge formation method according to claim 6 wherein
the impact unit is further configured to allow the sieve instrument to collide with an elastic body arranged at a collision position in a longitudinal direction of a reciprocating motion, so as to provide impact on the sieve instrument in a longitudinal direction as a collision-induced repulsive force, thereby improving a sieve function.

* * * * *